US010640413B2

(12) United States Patent
Lee et al.

(10) Patent No.: US 10,640,413 B2
(45) Date of Patent: May 5, 2020

(54) CELL CUTTING DEVICE AND CELL CUTTING METHOD (71) Applicant: SAMSUNG DISPLAY CO., LTD., Yongin-si, Gyeonggi-do (KR)

(72) Inventors: Jae-Pil Lee, Yongin-si (KR); Myeong-Lyeol Yu, Yongin-si (KR); Dae-Seung Mun, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 67 days.

(21) Appl. No.: 15/296,985

(22) Filed: Oct. 18, 2016

(65) Prior Publication Data
US 2017/0050876 A1 Feb. 23, 2017

Related U.S. Application Data (62) Division of application No. 13/662,009, filed on Oct. 26, 2012, now abandoned.

(30) Foreign Application Priority Data

Jun. 20, 2012 (KR) .................. 10-2012-0066317

(51) Int. Cl.
C03B 33/033 (2006.01)
G02F 1/13 (2006.01)
G02F 1/1333 (2006.01)

(52) U.S. Cl.
CPC .......... C03B 33/033 (2013.01); G02F 1/1303 (2013.01); G02F 1/133351 (2013.01);
(Continued)

(58) Field of Classification Search
CPC ............ C03B 33/033; G02F 1/133351; G02F 1/1303; Y10T 225/325; Y10T 225/329; Y10T 225/12; B65G 2249/04
(Continued)

(56) References Cited

U.S. PATENT DOCUMENTS 4,256,246 A 3/1981 Kindel
4,471,895 A * 9/1984 Lisec, Jr. .............. C03B 33/078
225/2
(Continued)

FOREIGN PATENT DOCUMENTS

KR 10-2003-0067998 A 8/2003
KR 10-2007-0006430 A 1/2007
(Continued)

OTHER PUBLICATIONS

Taiwan Office action dated May 15, 2016, for corresponding Taiwanese Patent Application 101143560 (7 pages).

Primary Examiner — Ghassem Alie
Assistant Examiner — Bharat C Patel
(74) Attorney, Agent, or Firm — Lewis Roca Rothgerber Christie LLP (57) ABSTRACT A cell cutting device and a cell cutting method are disclosed. The cell cutting device includes a loading stage configured to load a display sheet including a plurality of display cells, a rotation driving unit connected to the loading stage and configured to rotate the loading stage and to separate the display sheet into the plurality of display cells, and a position change unit connected to the loading stage and configured to change a position of the loading stage.

6 Claims, 6 Drawing Sheets (52) U.S. Cl.
CPC ......... *B65G 2249/04* (2013.01); *Y10T 225/12* (2015.04); *Y10T 225/325* (2015.04); *Y10T 225/329* (2015.04)

(58) Field of Classification Search
USPC ......... 83/13, 100, 879–887, 862–864; 225/2, 225/94–96, 96.5, 97, 103–105
See application file for complete search history.

(56) References Cited

U.S. PATENT DOCUMENTS

| | | | |
|---|---|---|---|
| 4,653,680 A | | 3/1987 | Regan |
| 5,069,195 A | * | 12/1991 | Barozzi ............... B28D 5/0023 125/23.01 |
| 5,133,491 A | * | 7/1992 | Correll ................ B28D 5/0023 225/1 |
| 5,297,582 A | | 3/1994 | Kitajima et al. |
| 5,297,710 A | | 3/1994 | Juras |
| 5,475,196 A | * | 12/1995 | Lisec .................. C03B 33/078 219/121.39 |
| 5,704,959 A | * | 1/1998 | Lisec .................. C03B 33/078 225/93.5 |
| 5,927,582 A | * | 7/1999 | Duecker ............. B26D 7/1827 225/2 |
| 5,944,244 A | * | 8/1999 | Lisec .................. C03B 33/078 225/103 |
| 6,434,974 B1 | * | 8/2002 | Lisec .................. C03B 33/078 225/104 |
| 6,655,566 B1 | * | 12/2003 | Martin ................ B26D 7/1827 225/101 |
| 6,741,320 B2 | | 5/2004 | Chae et al. |
| 6,774,978 B2 | | 8/2004 | Shin |
| 6,844,911 B2 | * | 1/2005 | Lee ................... G02F 1/133351 349/153 |
| 6,873,394 B2 | * | 3/2005 | Noiri ................. G02F 1/133351 349/158 |
| 6,913,177 B2 | | 7/2005 | Steiner |
| 7,131,562 B2 | | 11/2006 | Ueyama et al. |
| 7,234,620 B2 | | 6/2007 | Andrewlavage, Jr. |
| 7,553,390 B2 | | 6/2009 | Yamabuchi et al. |
| 7,605,901 B2 | | 10/2009 | Yoshino et al. |
| 7,710,533 B2 | | 5/2010 | Mori |
| 7,965,371 B2 | * | 6/2011 | Tasaka ............... G02F 1/133351 349/187 |
| 8,220,685 B1 | * | 7/2012 | Lindsey, Jr. ............ B26F 3/002 225/93 |
| 8,348,115 B2 | | 1/2013 | Wakayama |
| 8,496,150 B2 | * | 7/2013 | Lee ..................... B26D 7/1836 225/100 |
| 8,621,738 B2 | * | 1/2014 | Iwamoto ................ C03B 33/03 225/96.5 |
| 8,763,873 B2 | * | 7/2014 | Jans ...................... B26F 3/002 225/96.5 |
| 9,073,777 B2 | * | 7/2015 | Kang ..................... B26F 3/002 |
| 2004/0212774 A1 | | 10/2004 | Yamazaki et al. |
| 2005/0229755 A1 | | 10/2005 | Okajima et al. |
| 2007/0051769 A1 | | 3/2007 | Otoda et al. |
| 2007/0080187 A1 | | 4/2007 | Ueyama et al. |
| 2007/0158381 A1 | * | 7/2007 | Lisec .................. C03B 33/033 225/2 |
| 2008/0006669 A1 | | 1/2008 | Stangl et al. |
| 2008/0220553 A1 | * | 9/2008 | Park ................... G02F 1/133351 438/30 |
| 2010/0011927 A1 | | 1/2010 | Lee et al. |
| 2010/0011928 A1 | | 1/2010 | Lee et al. |
| 2011/0157510 A1 | * | 6/2011 | Hsu .................... G02F 1/133351 349/56 |
| 2012/0135177 A1 | | 5/2012 | Cornejo et al. |
| 2012/0241488 A1 | | 9/2012 | Kang et al. |
| 2012/0268708 A1 | * | 10/2012 | Chida ................ G02F 1/133351 349/153 |

FOREIGN PATENT DOCUMENTS

| | | |
|---|---|---|
| KR | 10-0789455 | 12/2007 |
| KR | 10-2010-0008607 | 1/2010 |
| KR | 10-2011-0008607 | 1/2010 |
| KR | 10-2011-0093609 | 8/2011 |
| TW | 200518897 A | 6/2005 |

* cited by examiner

CELL CUTTING DEVICE AND CELL CUTTING METHOD

CROSS-REFERENCE TO RELATED PATENT APPLICATION

This application is a divisional of U.S. patent application Ser. No. 13/662,099, filed Oct. 26, 2012, which claims priority to and the benefit of Korean Patent Application No. 10-2012-0066317, filed Jun. 20, 2012, the entire contents of both are incorporated herein by reference.

BACKGROUND

1. Field

Aspects of embodiments of the present invention relate to a cell cutting device and a cell cutting method.

2. Description of the Related Art

In general, various methods may be used to separate a plurality of cells that are formed in a sheet (for example, a substrate of display panels). In particular, a laser or a chemical treatment is generally used. For example, for a plurality of display panels formed on a common substrate, the laser or chemical treatment may be used to separate the display panels. The display panels may alternatively be manually separated.

However, when the aforementioned methods are used, the procedure may be complicated and incur a large manufacturing cost. On the other hand, when the cells are manually separated, quality may vary due to factors such as a difference in cutting pressure. In particular, with manual separation, production output may vary significantly according to factors such as the expertise of the workers.

SUMMARY

Embodiments of the present invention provide for a cell cutting device capable of easily and rapidly cutting a plurality of display cells, and for a cell cutting method.

According to an exemplary embodiment of the present invention, a cell cutting device is provided. The cell cutting device includes a loading stage configured to load a display sheet including a plurality of display cells, a rotation driving unit connected to the loading stage and configured to rotate the loading stage and to separate the display sheet into the plurality of display cells, and a position change unit connected to the loading stage and configured to change a position of the loading stage.

The cell cutting device may further include an adhesion unit connected to the loading stage and configured to adhere the display sheet and the plurality of display cells to the loading stage.

The adhesion unit may include an air intake part configured to intake air from an intake hole in the loading stage.

The rotation driving unit may include a cam connected to the loading stage, and a driving unit connected to the cam and configured to rotate the cam.

The cell cutting device may further include a support unit configured to support the loading stage and to receive a rotation axis of the loading stage, and a rotation member connected to the rotation axis and configured to rotate according to rotation of the cam.

The loading stage may include a plurality of loading stages. The rotation driving unit may include a plurality of rotation driving units arranged to correspond to the loading stages. The plurality of rotation driving units may be configured to operate in sequential order.

The loading stage may include a plurality of loading stages. The rotation angles of the plurality of loading stages may differ from each other.

The loading stage may include a plurality of loading stages. The position change unit may include a plurality of position change units arranged to correspond to the loading stages. The plurality of position change units may be located between respective adjacent ones of the plurality of loading stages and configured to separate the plurality of loading stages from each other.

The cell cutting device may further include a dummy removal unit separated from the loading stage and configured to remove a dummy cell of each of the plurality of display cells.

The loading stage may include a plurality of loading stages. The dummy removal unit may include a cutter unit between adjacent ones of the plurality of loading stages, and a cutter driving unit configured to linearly move the cutter unit toward the plurality of loading stages.

An end of the cutter unit may be tapered.

The cutter unit may include a plurality of cutter units arranged to correspond to the adjacent ones of the plurality of loading stages. The dummy removal unit may further include a position adjusting unit configured to linearly move the plurality of cutter units in a longitudinal direction of the display sheet.

The position adjusting unit may include a cylindrical cam unit connected to the plurality of cutter units, and a cam driving unit connected to the cylindrical cam unit and configured to rotate the cylindrical cam unit.

The cell cutting device may further include a crack forming unit configured to form a crack in the display sheet loaded onto the loading stage.

According to another exemplary embodiment of the present invention, a cell cutting method is provided. The method includes loading a display sheet including a plurality of display cells onto a loading stage, forming a crack between the plurality of display cells, separating the plurality of display cells from each other by rotating the loading stage in one direction, and rotating the loading stage in a direction opposite to the one direction.

The loading stage may include a plurality of loading stages arranged to correspond to the display cells. The method may further include separating the plurality of loading stages from each other in a longitudinal direction of the display sheet.

The loading of the display sheet may include adhering the display sheet and the plurality of display cells to the loading stage.

The loading stage may include a plurality of loading stages arranged to correspond to the display cells. The rotating of the loading stage in the one direction may include rotating the plurality of loading stages in sequential order.

The loading stage may include a plurality of loading stages arranged to correspond to the display cells. In the rotating of the loading stage in the one direction, rotation angles of the plurality of loading stages may differ from each other.

The method may further include removing a dummy region of each of the plurality of separated display cells by using a dummy removal unit.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown. The present invention may, however, be embodied in many different forms and should not be construed as being limited to the embodiments set forth herein. Rather, these exemplary embodiments are provided to more fully convey aspects and concepts of the invention to those of ordinary skill in the art.

The terms or words used in the following description should not be construed as limiting the spirit and scope of the following claims but should be construed as describing exemplary embodiments of the present invention. Throughout the specification, a singular form may include plural forms, unless there is a particular description contrary thereto. In addition, terms such as "comprise" and/or "comprising" are used to specify existence of, for example, a recited form, a process, an operation, and/or a component, not excluding the existence of one or more other recited forms, one or more other processes, one or more other operations, and/or one or more other components. Throughout the specification, while terms such as "first" and "second" are used to describe various components, the components are not limited to the terms "first" and "second". The terms "first" and "second" are used only to distinguish between each component.

Figure 1:
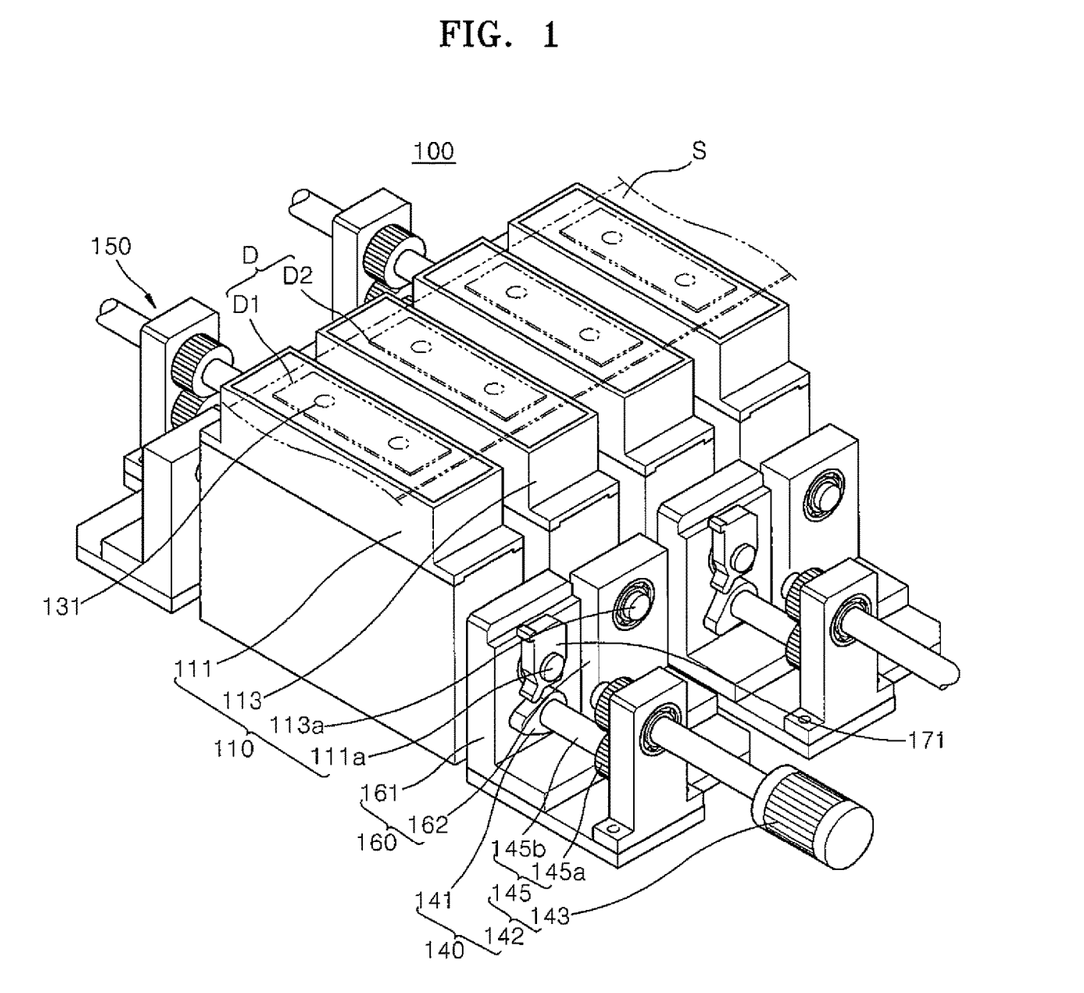
FIG. 1 is a perspective view of a cell cutting device according to an embodiment of the present invention.
Figure 2A:
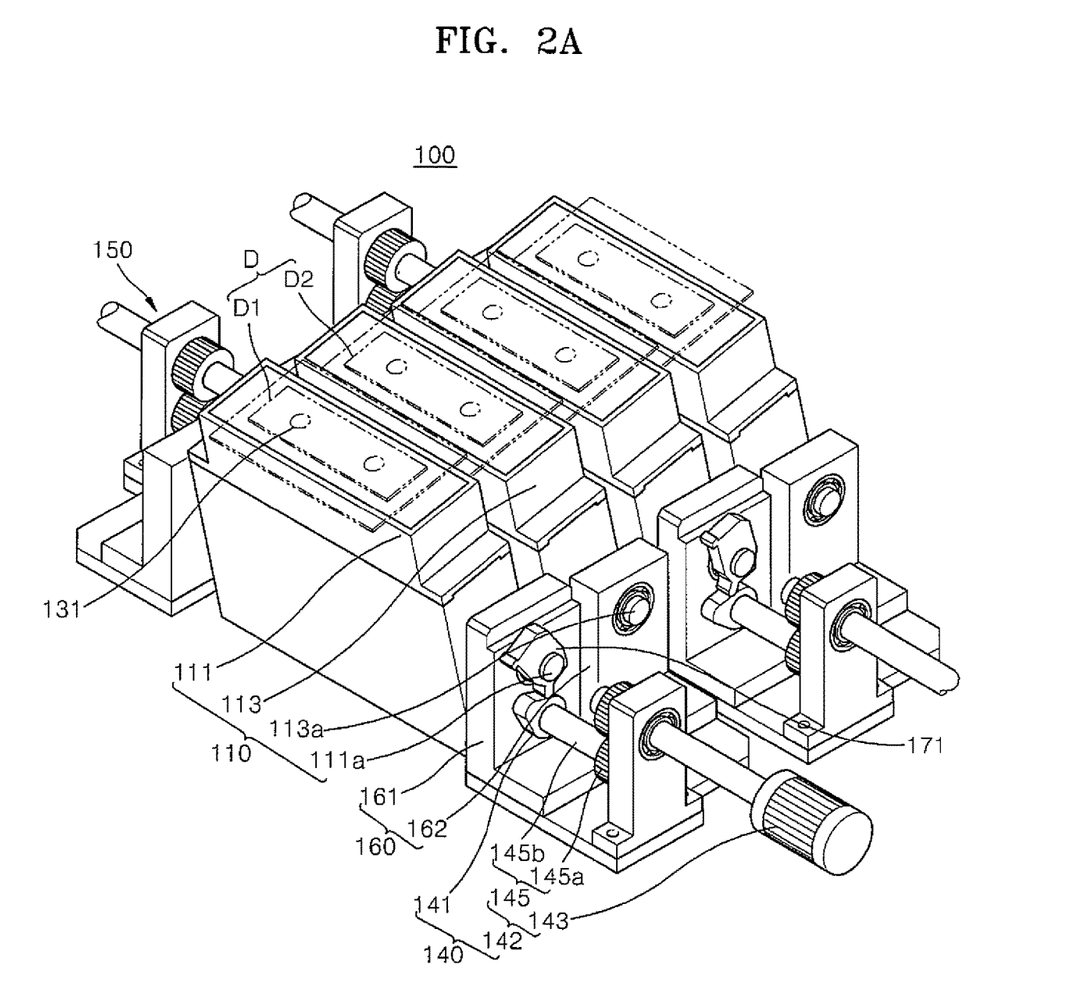
FIGS. 2A and 2B illustrate an operation of the cell cutting device of FIG. 1.
Figure 2B:
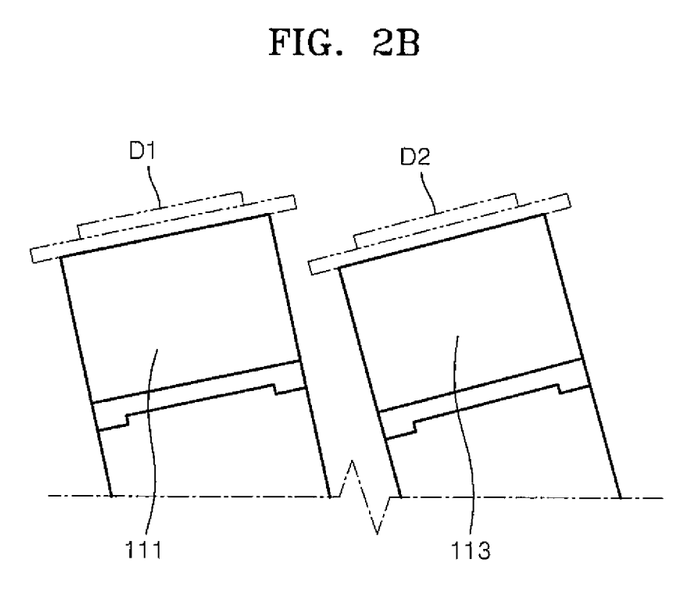
Figure 3:
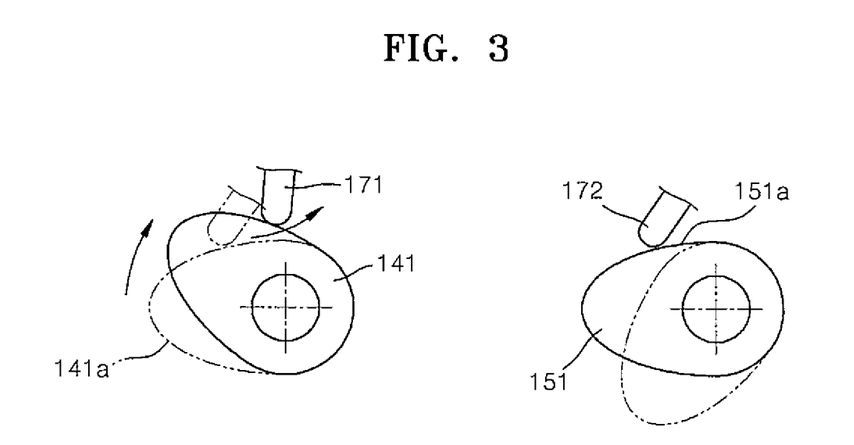
FIG. 3 illustrates operations of a first cam and a second cam shown in FIG. 1.

FIG. 1 is a perspective view of a cell cutting device 100 according to an embodiment of the present invention. FIGS. 2A and 2B illustrate an operation of the cell cutting device 100 of FIG. 1. FIG. 3 illustrates operations of a first cam 141 (and similarly, for a second cam 151) shown in FIG. 1.

Referring to FIGS. 1 through 3, the cell cutting device 100 includes a loading stage or a plurality of loading stages 110 to which a display sheet S having a plurality of display cells D formed thereon is loaded. The plurality of loading stages 110 may be arranged (e.g., to correspond to the display cells D). For example, the plurality of loading stages 110 may be arranged to support surfaces of the display cells D, respectively.

As shown in FIG. 1, the loading stages 110 include a first loading stage 111, and a second loading stage 113 that is separated from the first loading stage 111 by a set distance (for example, a predetermined distance). The number of loading stages 110 is not limited to any particular number and thus, may vary according to factors such as the number of display cells D. For example, when the number of display cells D is 10, the number of loading stages 110 may be 10. In addition, when the number of display cells D is 5, the number of loading stages 110 may be 5. Other numbers may also be chosen. For example, when the number of display cells D is 5, the number of loading stages 110 may be 10. Hereinafter, for convenience of description, it is assumed that the number of display cells D is 2, and the number of loading stages 110 is 2.

The display sheet S is a sheet on which the display cells D are disposed, for example located or arranged, in a particular form or arrangement, such as a checkered form (e.g., an array of one or more dimensions). For example, the display sheet S may have the display cells D arranged as an array in one direction. That is, the display sheet S may be arranged such that a first display cell D1, and a second display cell D2 that is separated from the first display cell D1 by a set distance (for example, a predetermined distance), are arranged in an array of one direction (e.g., in a line). Such a display sheet S may be loaded onto the loading stage 110 by an external apparatus.

The cell cutting device 100 may include an adhesion unit or a plurality of adhesion units that is part of (for example, is mounted in) the loading stage 110. The adhesion unit adheres to the display sheet S that is loaded onto the loading stage 110 and thus, may fix the display sheet S to the loading stage 110. In addition, after the display sheet S is separated into the display cells D, the adhesion unit may adhere to and fix the display cells D to the loading stage 110.

The plurality of adhesion units may be arranged (for example, arranged similarly to the display cells D on the display sheet S). The adhesion units may include a first adhesion unit located in (for example, mounted in) the first loading stage 111 and a second adhesion unit located in (for example, mounted in) the second loading stage 113. The first adhesion unit and the second adhesion unit may be formed in a similar manner. As such, for brevity of description, only the first adhesion unit will be described in further detail.

The first adhesion unit may be variously formed. For example, the first adhesion unit may have a first air intake part to intake air from a first intake hole 131 formed in the first loading stage 111. The first air intake part may include a first nozzle connected to the first intake hole 131 of the first loading stage 111, and a first intake pump to intake air through the first nozzle. In other embodiments, the first adhesion unit may be a concave structure to adhere to the display sheet S and the display cells D. Hereinafter, for convenience of description, it is assumed that the first adhesion unit has the first air intake part.

The cell cutting device 100 may include a rotation driving unit (or a plurality of rotation driving units) that is connected or attached to (for example, mounted to) the loading stage 110 to rotate the loading stage 110. The plurality of rotation driving units may be arranged (e.g., to correspond to the plurality of loading stages 110). For example, the rotation driving units may include a first rotation driving unit 140 connected to or mounted to the first loading stage 111, and a second rotation driving unit 150 connected to or mounted to the second loading stage 113. The first rotation driving unit 140 and the second rotation driving unit 150 may have similar configurations and functions. As such, for brevity of description, only the first rotation driving unit 140 will be described in further detail.

In the cell cutting device 100 of FIGS. 1-3, the first rotation driving unit 140 includes the first cam 141 connected to the first loading stage 111. In addition, the first rotation driving unit 140 includes a first driving unit 142 that is connected to the first cam 141 to rotate the first cam 141. The first driving unit 142 includes a first driving power generating unit 143 that is externally formed to generate a driving power. The first driving power generating unit 143 may be variously formed. For example, the first driving power generating unit 143 may include a first motor, a first cylinder, or the like. Hereinafter, for convenience of description, it is assumed that the first driving power generating unit 143 includes the first motor.

The first driving unit 142 also includes a first driving power delivering unit 145 that is connected to the first driving power generating unit 143 and the first cam 141 to deliver the driving power of the first driving power generating unit 143 to the first cam 141. The first driving power delivering unit 145 may be variously formed according to the form of the first driving power generating unit 143. For example, when the first driving power generating unit 143 is the first motor, the first driving power delivering unit 145 may include a first gear assembly 145*a* that rotates according to rotation of the first motor, and a first shaft 145*b* that is connected to the first cam 141 and rotates according to an operation of the first gear assembly 145*a*.

In other embodiments, when the first driving power generating unit 143 is the first cylinder, the first driving power delivering unit 145 may include a first link assembly that rotates or moves according to movement of the first cylinder, and a cam rotating member that is connected to the first cam 141 to rotate the first cam 141 according to an operation of the first link assembly. However, in the embodiment of FIG. 1, it is assumed that the first driving power generating unit 143 is the first motor. Thus, the first driving power delivering unit 145 includes the first gear assembly 145*a* and the first shaft 145*b*.

The cell cutting device 100 may include a support unit or a plurality of support units 160 that is mounted with a set distance (for example, a predetermined distance) from the loading stage 110. The plurality of support units 160 may be arranged (e.g., to correspond to the plurality of rotation driving units). A rotation axis (for example, first rotation axis 111*a* of the first loading stage 111 or second rotation axis 113*a* of the second loading stage 113) of the loading stage 110 may be rotatably inserted into the support unit 160.

In more detail, the support units 160 may include a first support unit 161 for supporting (for example, mounting with) the first loading stage 111 and separated by a set distance (for example, a predetermined distance) from the first loading stage 111, and a second support unit 162 for supporting (for example, mounting with) the second loading stage 113 and separated by a set distance (for example, a predetermined distance) from the second loading stage 113. The first support unit 161 and the second support unit 162 may be similarly formed. As such, for brevity of description, only the first support unit 161 will be described in further detail.

A plurality of first support units 161 may be arranged or mounted to face each other (for example, on opposite sides of the first loading stage 111), as shown in FIG. 1. In addition, the first support unit 161 may be formed such that the first rotation axis 111*a* of the first loading stage 111 may be inserted thereto. For example, the first rotation axis 111*a* may be rotatably inserted into the first support unit 161.

The cell cutting device 100 may include a rotation member or a plurality of rotation members (for example, first rotation member 171 and second rotation member 172) that is connected to or mounted on a rotation axis (for example, the first rotation axis 111*a* and the second rotation axis 113*a*) and rotates according to rotation of a cam (for example, the first cam 141 and the second cam 151). The plurality of rotation members may be arranged (e.g., to correspond to the cams), and the rotation members may include the first rotation member 171 connected to or mounted on the first rotation axis 111*a*, and the second rotation member 172 connected to or mounted on the second rotation axis 113*a*.

The first rotation member 171 and the second rotation member 172 may be similarly formed. As such, for brevity of description, only the first rotation member 171 will be described in further detail.

As shown in FIGS. 1 and 3, the first rotation member 171 has a shape with a protruding end. In particular, the protruding end of the first rotation member 171 may contact an exterior surface of the first cam 141. Thus, the first rotation member 171 rotates according to rotation of the first cam 141, so that the first rotation member 171 rotates the first rotation axis 111*a*.

The cell cutting device 100 may include a position change unit or a plurality of position change units that is connected to the loading stage 110 to change a position of the loading stage 110. For example, the position change unit may change the position of the loading stage 110 in a longitudinal direction of the display sheet S.

The plurality of position change units may be arranged (e.g., to correspond to the loading stages 110). For example, the position change units may be located between the loading stages 110, respectively. The respective position change units may operate to change a distance between the respective loading stages 110. For example, the position change units may include a first position change unit that is located between the first loading stage 111 and the second loading stage 113 to change a distance between the first loading stage 111 and the second loading stage 113.

In addition, the position change units may include a second position change unit that is located at or mounted on an exterior side of the second loading stage 113 to form a straight line with the first position change unit. The second position change unit may operate to adjust a position of the second loading stage 113 when the first position change unit operates (for example, when there are more than two loading stages, the second position change unit may operate to change a distance between the second loading stage 113 and a third loading stage).

The cell cutting device 100 may include a crack forming unit or a plurality of crack forming units that is disposed with a set distance (for example, a predetermined distance) from the loading stage 110 and that forms a crack in the display sheet S loaded onto the loading stage 110. The crack forming unit may form a crack between the display cells D disposed on the display sheet S.

In addition, the plurality of crack forming units may be arranged (for example, arranged to correspond to the loading stages 110 or the spaces between the loading stages 110). The crack forming units may include a first crack forming unit located between the first loading stage 111 and the second loading stage 113. In addition, the crack forming units may include a second crack forming unit located at an end of the first loading stage 111 or an end of the second loading stage 113, or between adjacent ones of the loading stages 110 (such as between the second loading stage 113 and a third loading stage, when there are more than two loading stages 110). The first crack forming unit and the second crack forming unit may be similarly formed. As such, for brevity of description, only the first crack forming unit will be described in further detail.

The first crack forming unit may include all types of devices capable of forming a crack between the display cells D, as described above. For example, the first crack forming unit may include one or more types of devices that form a crack, for example, by rotating a rotation body, by using a laser, or the like.

Hereinafter, operations of the cell cutting device 100 will be described in further detail.

1. Operation 1: Adhering a Display Sheet

When the cell cutting device 100 operates, a display sheet on which display cells D are arranged in a checkered form (for example, a two-dimensional matrix with rows and columns) may be cut in a row direction or a column direction. Accordingly, a plurality of display sheets S may be formed and each of the display sheets S may be supplied to the cell cutting device 100.

The first display cell D1 and the second display cell D2 formed on the display sheet S may be loaded onto the first loading stage 111 and the second loading stage 113, respectively. When the display sheet S is loaded, the first adhesion unit and the second adhesion unit operate to adhere to and to fix the display sheet S. In more detail, when the first intake pump operates, air is taken in by the first nozzle via the first intake hole 131. Due to the air intake via the first intake hole 131, a portion of the display sheet S on which the first display cell D1 is formed is adhered to the first loading stage 111. In addition, a second intake pump may operate in the same manner, so that a portion of the display sheet S on which the second display cell D2 is formed is adhered to the second loading stage 113.

2. Operation 2: Forming a Crack

While the display sheet S is adhered as in operation 1, a crack may be formed in the display sheet S by using the first crack forming unit and the second crack forming unit. In more detail, according to an operation of the first crack forming unit, a crack may be formed in a portion of the display sheet S between the first display cell D1 and the second display cell D2. In addition, according to an operation of the second crack forming unit, a crack may be formed in an end of the display sheet S or next to the second display cell D2 (such as between the second display cell D2 and a third display cell, when the display sheet S has more than two display cells D). The crack may be formed, for example, via a physical treatment or a chemical treatment.

3. Operation 3: Separating Display Cells

When the crack is formed as in operation 2, the loading stage 110 may rotate. For example, the first loading stage 111 and the second loading stage 113 may rotate to concentrate stress on the portion where the crack is formed. The first loading stage 111 and the second loading stage 113 may rotate with different rotation angles. In addition, the first loading stage 111 and the second loading stage 113 may rotate in sequential order.

In more detail, the first loading stage 111 and the second loading stage 113 may rotate with different rotation angles due to an exterior-surface shape of the first cam 141 and an exterior-surface shape of the second cam 151. A curvature of an exterior surface of the first cam 141, which is in contact with the first rotation member 171, may differ from a curvature of an exterior surface of the second cam 151, which is in contact with the second rotation member 172. Thus, due to a difference between the curvatures, rotation angles of the first cam 141 and the second cam 151 may differ from each other, so that the rotation angles of the first loading stage 111 and the second loading stage 113 differ from each other.

In addition, the first loading stage 111 and the second loading stage 113 may rotate with different rotation angles due to a contact between the first cam 141 and the first rotation member 171, and a contact between the second cam 151 and the second rotation member 172. That is, when a shape of first cam 141 and a shape of the second cam 151 are the same, initial contact portions for a start of rotation may differ from each other, so that the rotation angles of the first cam 141 and the second cam 151 differ from each other.

In more detail, the exterior surfaces of the first cam 141 and the second cam 151 may be the same. When the first cam 141 and the second cam 151 are combined with the first shaft 145b and a second shaft, respectively, the rotation angles of the first cam 141 and the second cam 151 may differ from each other with respect to the same reference line. For example, as shown in FIG. 3, when the reference line is in a vertical direction of the first loading stage 111 and the second loading stage 113, an initial position of the first cam 141 may be more rotated in one direction (e.g., a clockwise direction) than an initial position of the second cam 151. The rotation angles of the first cam 141 and the second cam 151 differ from each other according to their rotations, and the rotation angles of the first loading stage 111 and the second loading stage 113 differ from each other according to the rotations of the first cam 141 and the second cam 151, so that the first loading stage 111 and the second loading stage 113 rotate in sequential order.

In addition to this driving, the rotations of the first loading stage 111 and the second loading stage 113 may be controlled from levels of driving by the first driving unit 142 and a second driving unit that differ from each other. In more detail, by controlling an operation time, a rotation count, or the like of the first driving unit 142 and the second driving unit that drive the first cam 141 and the second cam 151, respectively, the first loading stage 111 and the second loading stage 113 may rotate in sequential order, and the rotation angles of the first loading stage 111 and the second loading stage 113 may differ from each other.

As described, operations of the first loading stage 111 and the second loading stage 113 may be similarly performed. Hereinafter, for convenience of description, it is assumed that the rotation angles of the first loading stage 111 and the second loading stage 113 are sequentially controlled due to a difference between initial positions of the first cam 141 and the second cam 151.

When the first cam 141 and the second cam 151 rotate as described above, first, the first driving unit 142 rotates. According to driving by the first driving unit 142, the first gear assembly 145a operates, and the first shaft 145b rotates, so that the first cam 141 rotates. As shown in FIG. 3, at initial positions of the first cam 141 and the first rotation member 171, a protruding portion of the first rotation member 171 contacts a first surface 141a of the first cam 141. On the other hand, at initial positions of the second cam 151 and the second rotation member 172, a protruding portion of the second rotation member 172 does not contact a first surface 151a of the second cam 151.

In order to allow the first rotation member 171 and the second rotation member 172 to rotate according to rotations of the first cam 141 and the second cam 151, respectively, the protruding portion of the first rotation member 171 has to contact the first surface 141a of the first cam 141, and the protruding portion of the second rotation member 172 has to contact the first surface 151a of the second cam 151. Since the first rotation member 171 contacts the first surface 141a of the first cam 141 at the initial position of the first rotation member 171, the first rotation member 171 rotates according to the driving by the first driving unit 142. On the other hand, because the second rotation member 172 does not contact the first surface 151a of the second cam 151 at the initial position of the second rotation member 172, the second rotation member 172 does not rotate according to the driving by the second driving unit.

When the first cam 141 operates in this manner, the first surface 141a of the first cam 141 contacts the protruding portion of the first rotation member 171, so that the first cam 141 applies a force to the first rotation member 171 according to the rotation of the first cam 141. While the first rotation member 171 rotates, the first rotation member 171 rotates the first rotation axis 111a, so that the first loading stage 111 rotates.

On the other hand, when the second cam 151 operates in this manner, the second cam 151 initially does not rotate according to an operation of the second driving unit. Since the protruding portion of the second rotation member 172 does not contact the first surface 151a, the second rotation member 172 initially does not rotate. However, when the second driving unit continuously operates, the protruding portion of the second rotation member 172 contacts the first surface 151a of the second cam 151, so that the second cam 151 rotates the second rotation member 172. The second rotation member 172 rotates the second rotation axis 113a, so that the second loading stage 113 rotates.

When the first loading stage 111 and the second loading stage 113 operate in the above manner, the rotation angles of the first loading stage 111 and the second loading stage 113 differ from each other. In addition, because the first driving unit 142 and the second driving unit sequentially operate, the first loading stage 111 and the second loading stage 113 rotate in sequential order. Because the first loading stage 111 and the second loading stage 113 sequentially rotate with the different angles, the first loading stage 111 and the second loading stage 113 may provide a force capable of separating the first display cell D1 and the second display cell D2.

4. Operation 4: Adjusting a Distance Between First Loading Stage and Second Loading Stage While operation 3 is being performed or after operation 3 is completed, a distance between the first loading stage 111 and the second loading stage 113 may be adjusted. In more detail, when the first position change unit that is located between the first loading stage 111 and the second loading stage 113 operates, the distance between the first loading stage 111 and the second loading stage 113 may be changed. For example, when the first position change unit operates, the distance between the first loading stage 111 and the second loading stage 113 may be decreased or increased.

For example, when the first loading stage 111 and the second loading stage 113 rotate, the first position change unit may operate to increase the distance between the first loading stage 111 and the second loading stage 113. In addition, the second position change unit may operate to adjust a position of the second loading stage 113.

When the distance between the first loading stage 111 and the second loading stage 113 is adjusted as described above, fragments or foreign substances that occur in separation of the first display cell D1 and the second display cell D2 may fall in a gap between the first loading stage 111 and the second loading stage 113. In addition, by increasing the distance between the first loading stage 111 and the second loading stage, it is possible to prevent collision between the first display cell D1 and the second display cell D2 due to the rotations of the first loading stage 111 and the second loading stage 113.

5. Operation 5: Repositioning a First Loading Stage and a Second Loading Stage

When operations 1 through 4 are completed, the first loading stage 111 and the second loading stage 113 may return to their initial states. For example, the first loading stage 111 and the second loading stage 113 may return to their original positions in a reverse or similar manner to the above sequential rotations. In more detail, the first position change unit and the second position change unit may operate in a reverse manner to the above operations, so that the distance between the first loading stage 111 and the second loading stage 113 is decreased.

For example, the adjustment of the distance between the first loading stage 111 and the second loading stage 113 may be performed before rotations of the first loading stage 111 and the second loading stage 113 (which will be described later) are performed, or may be concurrently (e.g., simultaneously) performed with the rotations of the first loading stage 111 and the second loading stage 113. After or while the distance between the first loading stage 111 and the second loading stage 113 is adjusted as described above, the first driving unit 142 and the second driving unit may operate in a reverse manner to the above operations.

When the first driving unit 142 operates, the first cam 141 rotates and the first rotation member 171 returns to its original state. For example, an elastic member may be arranged between the first rotation member 171 and the first support unit 161, so that the elastic member provides a restitution force to the first rotation member 171. For example, the elastic member may include a torsion spring to provide the restitution force to the first rotation member 171. When the restitution force is applied to the first rotation member 171, the first rotation member 171 rotates in a reverse direction to that of operation 3. Then, the first rotation axis 111a rotates due to the first rotation member 171, so that the first loading stage 111 returns to its original state.

In addition, when the second driving unit operates, the second cam 151 may rotate so that the second rotation member 172 returns to its original state. Since the second loading stage 113 operates in a similar manner to the first loading stage 111, further description thereof is not repeated here.

When the first loading stage 111 and the second loading stage 113 rotate, the first loading stage 111 and the second loading stage 113 may concurrently (e.g., simultaneously) rotate in a different manner from that of operation 3. For example, the second driving unit may equally rotate with the first driving unit 142, so that the second driving unit rotates the second cam 151 to the initial position as described in operation 3.

Thus, the cell cutting device 100 and the cell cutting method may cut the display cells D via a tilting movement, so that the cell cutting device 100 and the cell cutting method rapidly and easily cut the display cells D. In addition, the cell cutting device 100 and the cell cutting method may prevent collision between adjacent display cells D, so that it is possible to prevent product breakage after the display cells D are cut, and to improve product quality.

Figure 4:
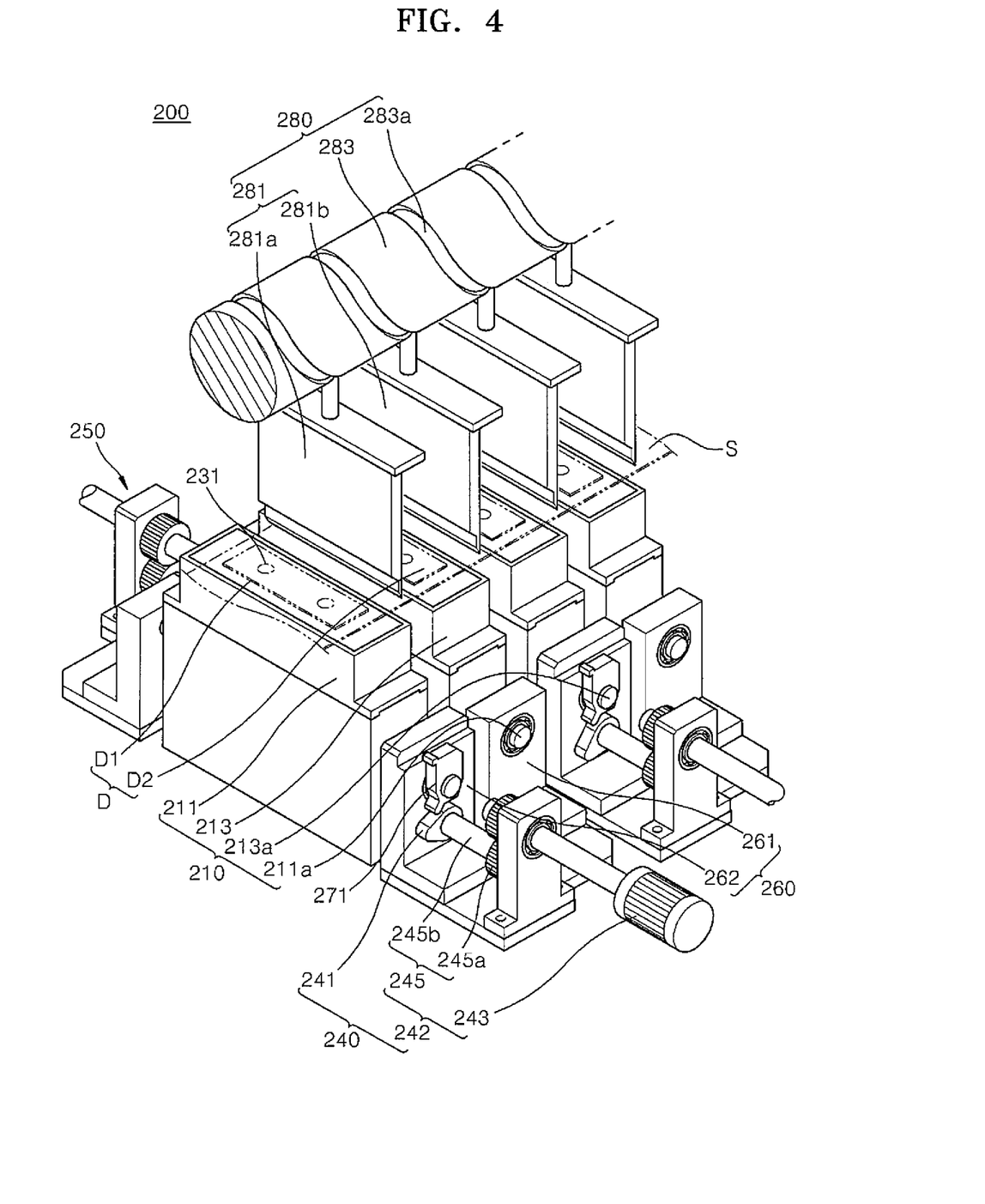
FIG. 4 is a perspective view of a cell cutting device according to another embodiment of the present invention.
Figure 5:
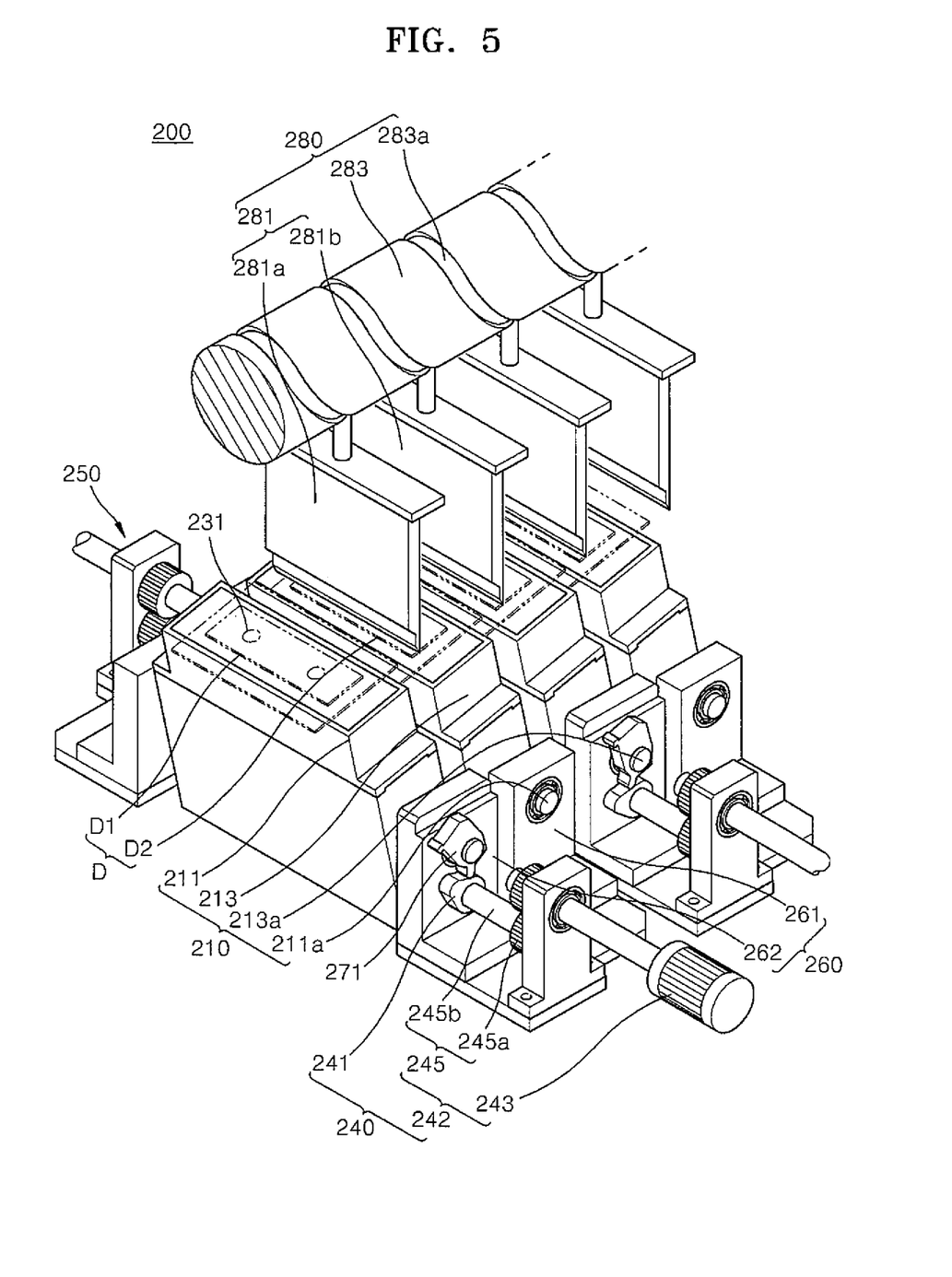
FIG. 5 illustrates an operation of the cell cutting device of FIG. 4.
Figure 6:
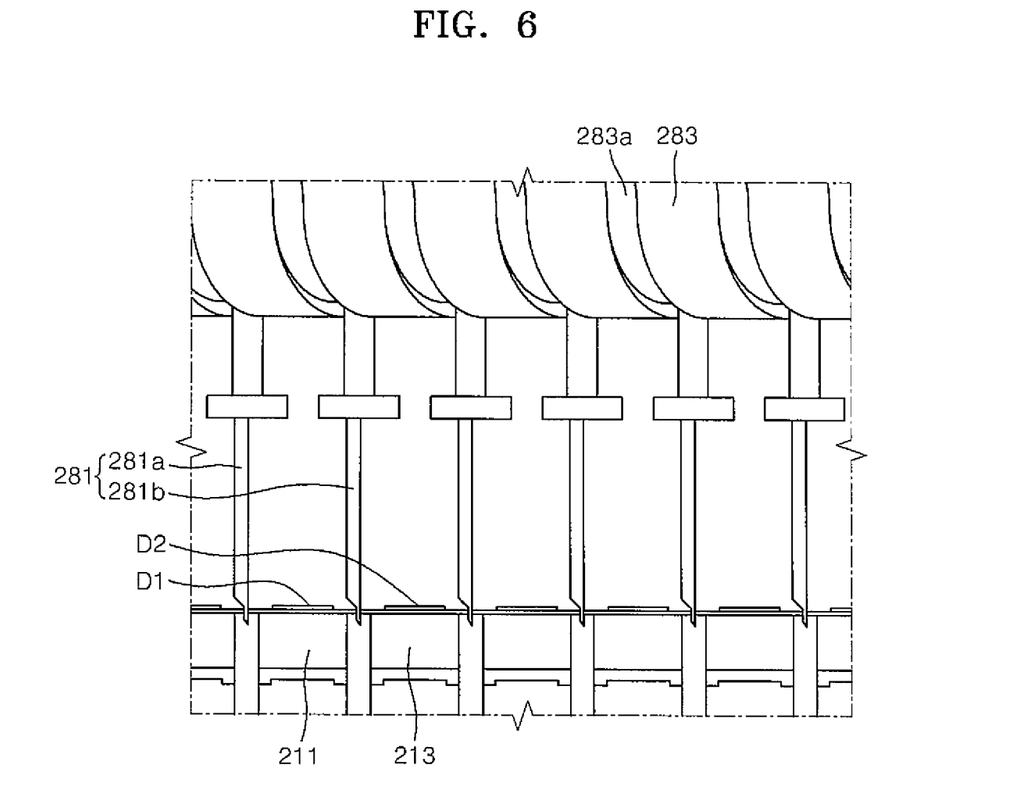
FIG. 6 illustrates an operation of a dummy removal unit of FIG. 4.

FIG. 4 is a perspective view of a cell cutting device 200 according to another embodiment of the present invention. FIG. 5 illustrates an operation of the cell cutting device 200 of FIG. 4. FIG. 6 illustrates an operation of a dummy removal unit 280 of FIG. 4.

Referring to FIGS. 4 through 6, the cell cutting device 200 may include a loading stage or a plurality of loading stages 210, a rotation driving unit or a plurality of rotation driving units (for example, first rotation driving unit 240 and second rotation driving unit 250), a position change unit or a plurality of position change units, a support unit or a plurality of support units 260, and an adhesion unit or a plurality of adhesion units. The plurality of loading stages 210, the rotation driving units, the position change units, the support units 260, and the adhesion units may be arranged (e.g., to correspond to one another).

The loading stage 210 may include a first loading stage 211 and a second loading stage 213. The rotation driving unit may include the first rotation driving unit 240 and the second rotation driving unit 250. The position change unit may include a first position change unit and a second position change unit. The adhesion unit may include a first adhesion unit and a second adhesion unit. The support unit 260 may include a first support unit 262 and a second support unit 261.

The loading stage 210, the rotation driving unit, the position change unit, the support unit 260, and the adhesion unit are similar to (e.g., equivalent to) the loading stage 110, the rotation driving unit, the position change unit, the support unit 160, and the adhesion unit as described above with reference to FIGS. 1 through 3 and thus, detailed descriptions thereof will not be repeated.

In addition, the first loading stage 211, the second loading stage 213, the first rotation driving unit 240, the second rotation driving unit 250, the first position change unit, the second position change unit, the first support unit 262, the second support unit 261, the first adhesion unit (including, for example, a first intake hole 231), and the second adhesion unit are similar to (e.g., equivalent to) the first loading stage 111, the second loading stage 113, the first rotation driving unit 140, the second rotation driving unit 150, the first position change unit, the second position change unit, the first support unit 161, the second support unit 162, the first adhesion unit (including, for example, the first intake hole 131), and the second adhesion unit as described above with reference to FIGS. 1 through 3 and thus, detailed descriptions thereof will not be repeated.

As shown in FIG. 4, the cell cutting device 200 includes the dummy removal unit 280 that is positioned or mounted with a set distance (for example, a predetermined distance) from the loading stage 210, on which a display sheet having a plurality of display cells ID (for example first display cell D1 and second display cell D2) are positioned or mounted. The dummy removal unit 280 removes a dummy (for example, a dummy cell or dummy region, such as a portion of the display sheet S between adjacent ones of the display cells ID) of a cut display sheet S.

In addition, the dummy removal unit 280 includes a cutter unit or a plurality of cutter units 281 that is located between the loading stages 210, and a cutter driving unit that moves (for example, linearly moves) the cutter unit 281 toward the loading stages 210. The cutter driving unit may include various devices. For example, the cutter driving unit may include a motor for linearly moving the cutter unit 281, and a cylinder. Hereinafter, it is assumed that the cutter driving unit includes the cylinder.

An end of the cutter unit 281 may be inclined or tapered, as shown in FIG. 6. For example, the end of the cutter unit 281 that is formed above the loading stage 210 may be inclined or tapered. In addition, the plurality of cutter units 281 may be arranged (e.g., to correspond to the loading stages). The cutter units 281 may include a first cutter unit 281a located between the first loading stage 211 and the second loading stage 213. The cutter units 281 may also include a second cutter unit 281b that is located at an end of the first loading stage 211 or an end of the second loading stage 213 to face the first cutter unit 281a (for example, when there are more than two loading stages 210, the second cutter unit 281b may be located between the second loading stage 213 and a third loading stage).

The dummy removal unit 280 may include a position adjusting unit that linearly moves the cutter units 281 in a set direction (for example, a longitudinal direction) of the display sheet S. For example, the position adjusting unit may linearly move the first cutter unit 281a and the second cutter unit 281b in the longitudinal direction of the display sheet S. The position adjusting unit may include a cylindrical cam unit 283 on which the cutter units 281 are formed, and a cam driving unit that is connected to the cylindrical cam unit 283 and rotates the cylindrical cam unit 283.

An end of the first cutter unit 281a and an end of the second cutter unit 281b may slide within the cylindrical cam unit 283. For example, sliding grooves 283a are spirally formed on the cylindrical cam unit 283, so that the first cutter unit 281a and the second cutter unit 281b are combined (e.g., joined or connected) thereto.

With respect to operations of the cell cutting device 200, the operations of the cell cutting device 200 may be performed in a manner similar to those described above with reference to FIGS. 1 through 3. That is, operation 1 of adhering a display sheet, operation 2 of forming a crack, operation 3 of separating display cells, and operation 4 of adjusting a distance between first loading stage and second loading stage of the cell cutting device 200 may be performed in a manner similar to those described above with reference to FIGS. 1 through 3. Thus, for convenience of description, detailed descriptions regarding operations 1 through 4 will not be repeated.

5. Operation 5': Repositioning a First Loading Stage and a Second Loading Stage

When the above procedure (e.g., operations 1 through 4) is completed, the first loading stage 211 and the second loading stage 213 may return to their original positions. While the first loading stage 211 and the second loading stage 213 may return to their original positions in a manner similar to operation 5 described above with reference to FIGS. 1 through 3, the first position change unit and the second position change unit may instead not operate and thus, not change the distance between the loading stages 210. Since the first position change unit and the second position change unit do not operate, the first loading stage 211 and the second loading stage 213 rotate with a distance therebetween. In addition, the first loading stage 211 and the second loading stage 213 may maintain a farther distance therebetween, compared to operation 1.

The first loading stage 211 and the second loading stage 213 may also operate in a manner similar to (e.g., equivalent to) operation 5 described above with reference to FIGS. 1 through 3. Hereinafter, for convenience of description, it is assumed that the first loading stage 211 and the second loading stage 213 operate in a manner equivalent to operation 5 described above with reference to FIGS. 1 through 3.

6. Operation 6: Removing a Dummy

When the first loading stage 211 and the second loading stage 213 return to their original positions as described above, the first display cell D1 and the second display cell D2 may be separated with dummies that are irrelevant to or are not necessary for an operation (e.g., waste portions of the display sheet S). In this case, the position adjusting unit may operate. In more detail, when the cam driving unit operates, the cylindrical cam unit 283 rotates so that the first cutter unit 281a and the second cutter unit 281b are aligned (for example, aligned with respect to the display sheet S and to the display cells D). For example, the first cutter unit 281a and the second cutter unit 281b may be positioned at the dummies of the first display cell D1 and the second display cell D2, respectively.

When the alignment is completed as described above, the cutter driving unit operates to linearly move the first cutter unit 281a and the second cutter unit 281b toward the first display cell D1 and the second display cell D2. For example, when the first cutter unit 281a and the second cutter unit 281b operate, the first cutter unit 281a and the second cutter unit 281b may remove the dummies of the first display cell D1 and the second display cell D2 by applying a force thereto. A crack may be formed in the dummies as described in operation 2, and then the removal of the dummies may be performed in sequential order. In addition, it is possible that a dummy region is previously set in operation 1, and the crack is formed in operation 2.

Thus, the cell cutting device 200 and the cell cutting method may cut the display cells D via a tilting movement, so that the cell cutting device 200 and the cell cutting method rapidly and easily cut the display cells D. In addition, the cell cutting device 200 and the cell cutting method may prevent collision between adjacent display cells D, so that it is possible to prevent product breakage after the display cells D are cut and to improve product quality. Since the cell cutting device 200 and the cell cutting method may separate the display cells D and then may easily remove the unnecessary dummies, the manufacturing procedure may rapidly proceed.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A cell cutting method comprising:
   loading a display sheet comprising a plurality of display cells onto a loading stage that comprises a plurality of loading stages spaced apart from one another and arranged to correspond to the display cells, each of the plurality of loading stages having a top surface;
   separating the plurality of display cells from each other by rotating the plurality of loading stages in one direction, wherein the rotating of the plurality of loading stages results in the top surfaces being in different planes;
   rotating the plurality of loading stages in a direction opposite to the one direction; and
   removing a dummy region of each of the plurality of separated display cells by using a dummy removal unit comprising a cutter unit that removes the dummy region,
   wherein the top surfaces of the plurality of loading stages do not directly contact one another,
   wherein the plurality of loading stages rotate in the one direction or in the direction opposite to the one direction due to rotation of a plurality of cams respectively coupled to the plurality of loading stages, and
   wherein the dummy region of each of the plurality of separated display cells is removed after separating the plurality of display cells from each other by rotating the plurality of loading stages in the one direction.

2. The cell cutting method of claim 1, wherein
   the cell cutting method further comprises separating the plurality of loading stages from each other in a longitudinal direction of the display sheet.

3. The cell cutting method of claim 1, wherein the loading of the display sheet comprises adhering the display sheet and the plurality of display cells to the loading stage.

4. The cell cutting method of claim 1, wherein
   the rotating of the loading stage in the one direction comprises rotating the plurality of loading stages in sequential order.

5. The cell cutting method of claim 1, wherein
   in the rotating of the loading stage in the one direction, rotation angles of the plurality of loading stages differ from each other due to contact portion between respective rotation members and an exterior-surface shape of the respective cams.

6. The cell cutting method of claim 1, wherein a rotation axis of the loading stage connected with a rotation member rotates according to rotation of the cam, and
   the rotation member comprises a protruding end that selectively contacts an exterior surface of the cam.

* * * * *